US012467618B2

(12) United States Patent
Chen

(10) Patent No.: US 12,467,618 B2
(45) Date of Patent: Nov. 11, 2025

(54) STANDING FURNITURE HAVING A BUILT-IN LAMP

(71) Applicant: Ching-Hui Chen, Huizhou (CN)

(72) Inventor: Ching-Hui Chen, Huizhou (CN)

( * ) Notice: Subject to any disclaimer, the term of this patent is extended or adjusted under 35 U.S.C. 154(b) by 0 days.

(21) Appl. No.: 18/749,871

(22) Filed: Jun. 21, 2024

(65) Prior Publication Data

US 2025/0251121 A1 Aug. 7, 2025

Related U.S. Application Data

(60) Provisional application No. 63/550,304, filed on Feb. 6, 2024.

(51) Int. Cl.

| | |
|---|---|
| ***F21V 23/06*** | (2006.01) |
| ***F21V 33/00*** | (2006.01) |
| *F21Y 113/00* | (2016.01) |
| *F21Y 115/10* | (2016.01) |

(52) U.S. Cl.
CPC .......... *F21V 33/0012* (2013.01); *F21V 23/06* (2013.01); *F21Y 2113/00* (2013.01); *F21Y 2115/10* (2016.08)

(58) Field of Classification Search
CPC .. F21V 23/06; F21V 33/0012; F21V 33/0048; F21S 4/20; F21S 4/28; F21S 6/002; F21S 6/003; F21S 6/004; F21S 6/005; F21S 6/006; F21S 6/007; F21S 6/008
See application file for complete search history.

(56) References Cited

U.S. PATENT DOCUMENTS

| | | | | |
|---|---|---|---|---|
| 4,992,704 | A * | 2/1991 | Stinson | H05B 45/40 362/800 |
| 6,283,612 | B1 * | 9/2001 | Hunter | F21V 15/04 362/240 |
| 7,549,784 | B1 * | 6/2009 | Teeters | F21V 23/06 362/147 |
| 8,545,045 | B2 * | 10/2013 | Tress | F21V 21/005 362/225 |
| 8,562,167 | B1 * | 10/2013 | Meier | F21V 33/0012 362/125 |
| 8,979,296 | B2 * | 3/2015 | Wiemer | F21V 23/001 362/125 |
| 9,098,823 | B2 * | 8/2015 | Slesinger | H01R 25/142 |
| 9,374,856 | B2 * | 6/2016 | Winton | F21S 4/28 |
| 9,596,950 | B2 * | 3/2017 | Waalkes | F21V 23/06 |
| 10,533,737 | B1 * | 1/2020 | Dos Reis | F21V 23/06 |
| 10,539,309 | B2 * | 1/2020 | Danville | F21V 23/008 |
| 10,851,988 | B2 * | 12/2020 | Rutherford | F21S 8/03 |

(Continued)

*Primary Examiner* — Ismael Negron
(74) *Attorney, Agent, or Firm* — WPAT, PC

(57) ABSTRACT

A standing furniture includes a base, a lamp holder, a circuit board, a connector interface and an adapter module. The lamp holder is disposed in the base. The circuit board is disposed in the base and located on the lamp holder. The circuit board includes a plurality of light sources. The connector interface is disposed in the base and includes a cartridge and a connector socket module disposed in the cartridge. The connector socket module is configured to electrically connected connect to the circuit board. The connector socket module is electrically connected to an external power source via the adapter module.

20 Claims, 15 Drawing Sheets

(56) References Cited

U.S. PATENT DOCUMENTS

| | | | | |
|---|---|---|---|---|
| 11,779,132 B2 * | 10/2023 | McMillin | F25D 25/02 | 362/125 |
| 12,044,464 B2 * | 7/2024 | McMillin | F25D 27/00 | |
| 2012/0314407 A1 * | 12/2012 | Souvay | F21S 4/28 | 362/222 |
| 2014/0036505 A1 * | 2/2014 | Barton | F21V 21/005 | 362/249.06 |
| 2024/0122338 A1 * | 4/2024 | Chen | F21V 23/023 | |

* cited by examiner

STANDING FURNITURE HAVING A BUILT-IN LAMP

TECHNICAL FIELD

The present disclosure relates to a standing furniture, in particular to a standing furniture having a built-in lamp.

BACKGROUND

A currently available standard lamp includes a standard, a lamp seat installed in the standard, a lamp, a circuit board, and a USB connector. The interface of the USB connector is soldered onto the circuit board and electrically connected with the circuit board, cooperating with the circuit board to form an integral structure. However, such a structure containing the USB connector and the circuit board occupies a larger volume and may hinder the installation of the USB connector. For example, it is inconvenient to install the UBS connector in the standard of the standard lamp, especially a small standard. Further, the bulky USB connector may influence the appearance of the standard. Besides, the color of the light emitted by the standard lamp is not adjustable.

SUMMARY

One embodiment of the disclosure provides a standing furniture having a built-in lamp, which includes a base, a lamp holder, a circuit board, a connector interface and an adapter module. The lamp holder is disposed in the base. The circuit board is disposed in the base and located on the lamp holder. The circuit board includes a plurality of light sources. The connector interface is disposed in the base and includes a cartridge and a connector socket module disposed in the cartridge. The connector socket module is electrically connected to the circuit board. The connector socket module is electrically connected to an external power source via the adapter module.

In one embodiment, the standing furniture further includes a supporting holder. The base is disposed on the supporting holder.

In one embodiment, the adapter module has a connector interface inserted into the connector socket module.

In one embodiment, the cartridge has an opening, and the connector interface is inserted into the connector socket module after the connector interface passes through the opening.

In one embodiment, the connector interface is a USB Type-A connector, a USB Type-B connector, a USB Type-C connector, or a mini-USB connector.

In one embodiment, the adapter module further has a controller, and the connector interface is connected to the adapter module via the controller.

In one embodiment, the controller can be used to adjust the color and/or the intensity of the light emitted by each light source.

In one embodiment, the lighting sources are light-emitting diodes.

In one embodiment, the base is a rectangular frame.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRA WINGS

The present disclosure will become more fully understood from the detailed description given herein below and the accompanying drawings which are given by way of illustration only, and thus are not limitative of the present disclosure and wherein.

FIG. 5~FIG. 12 are schematic views of manufacturing a base of a standing furniture having a built-in lamp in accordance with another embodiment of the disclosure.

Figure 13:
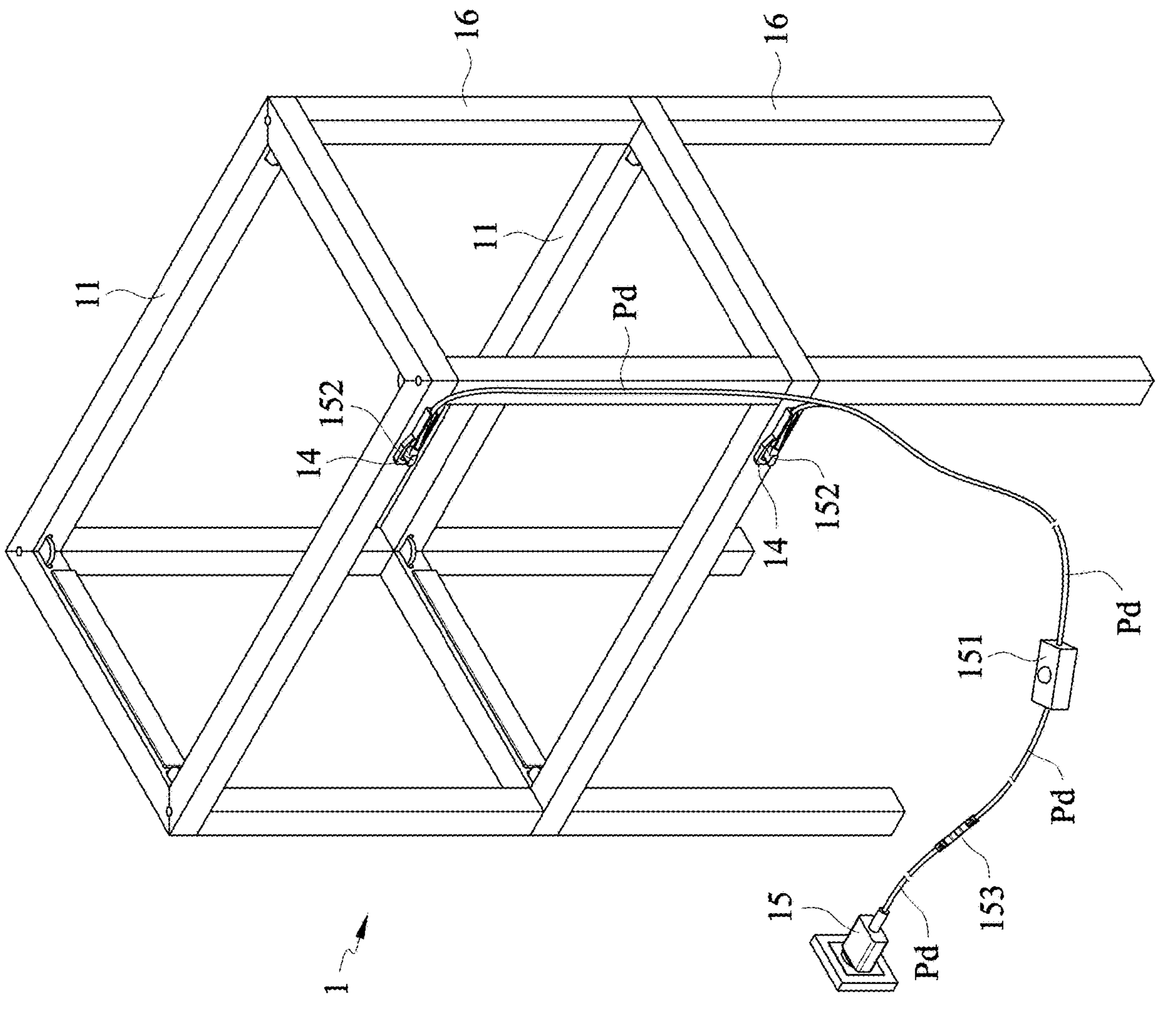

FIG. 13 is a perspective view of a standing furniture having the built-in lamp in accordance with another embodiment of the disclosure.

Figure 14:
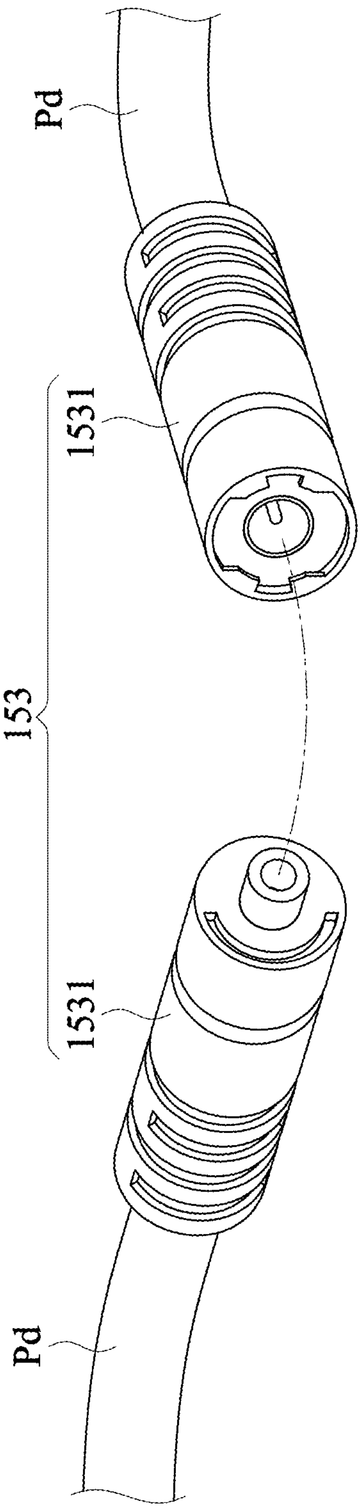

FIG. 14 is a first partial enlargement view of a connecting module of the standing furniture having the built-in lamp in accordance with another embodiment of the disclosure.

Figure 15:
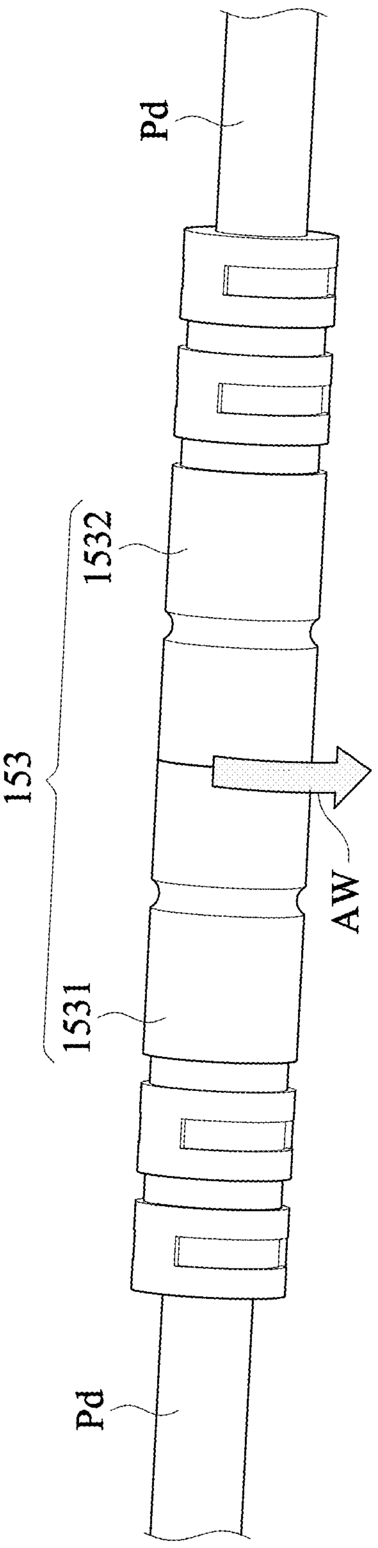

FIG. 15 is a second partial enlargement view of the connecting module of the standing furniture having the built-in lamp in accordance with one embodiment of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 1:
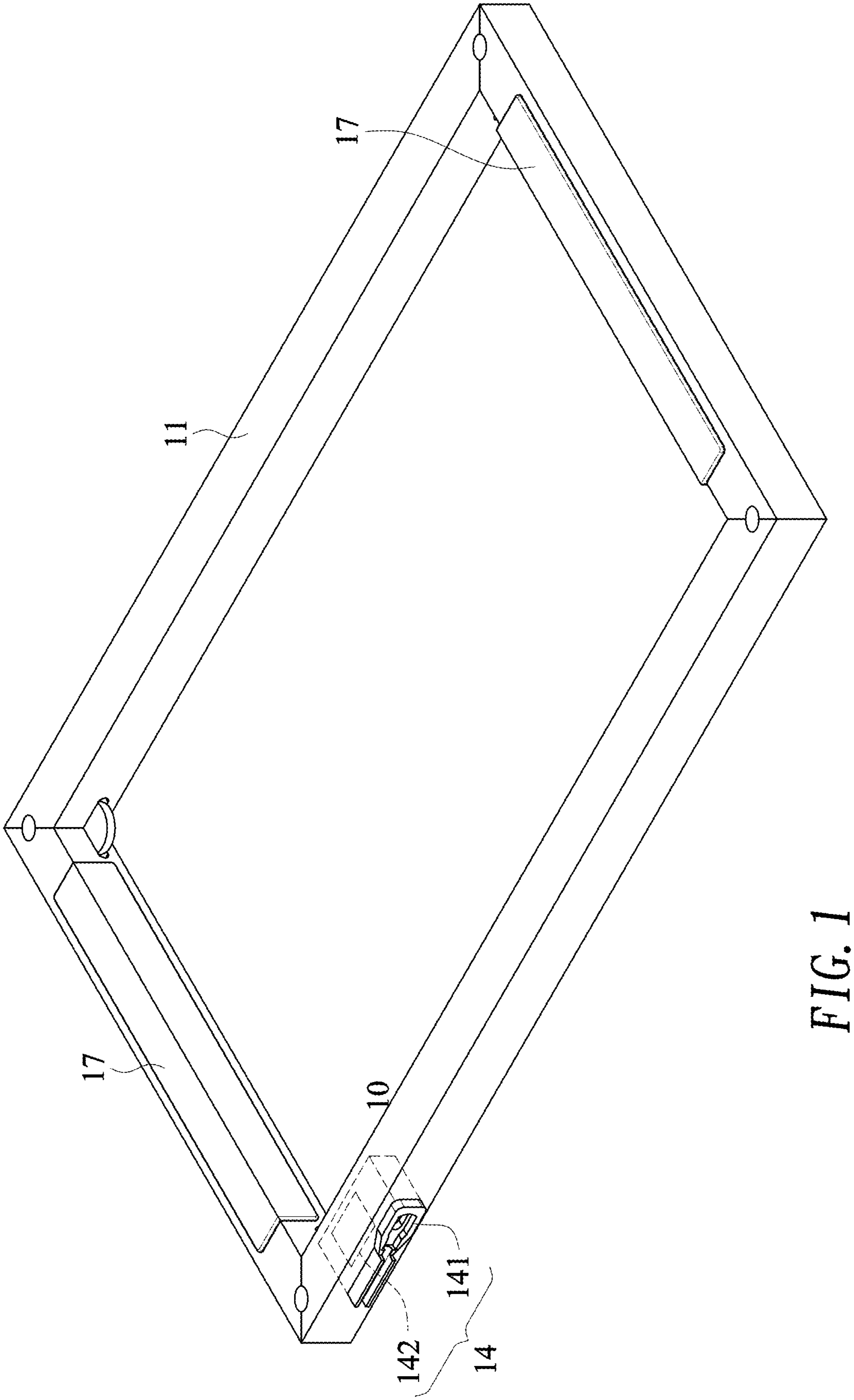
FIG. 1 is a perspective view of a part of a standing furniture having a built-in lamp in accordance with one embodiment of the disclosure.
Figure 2:
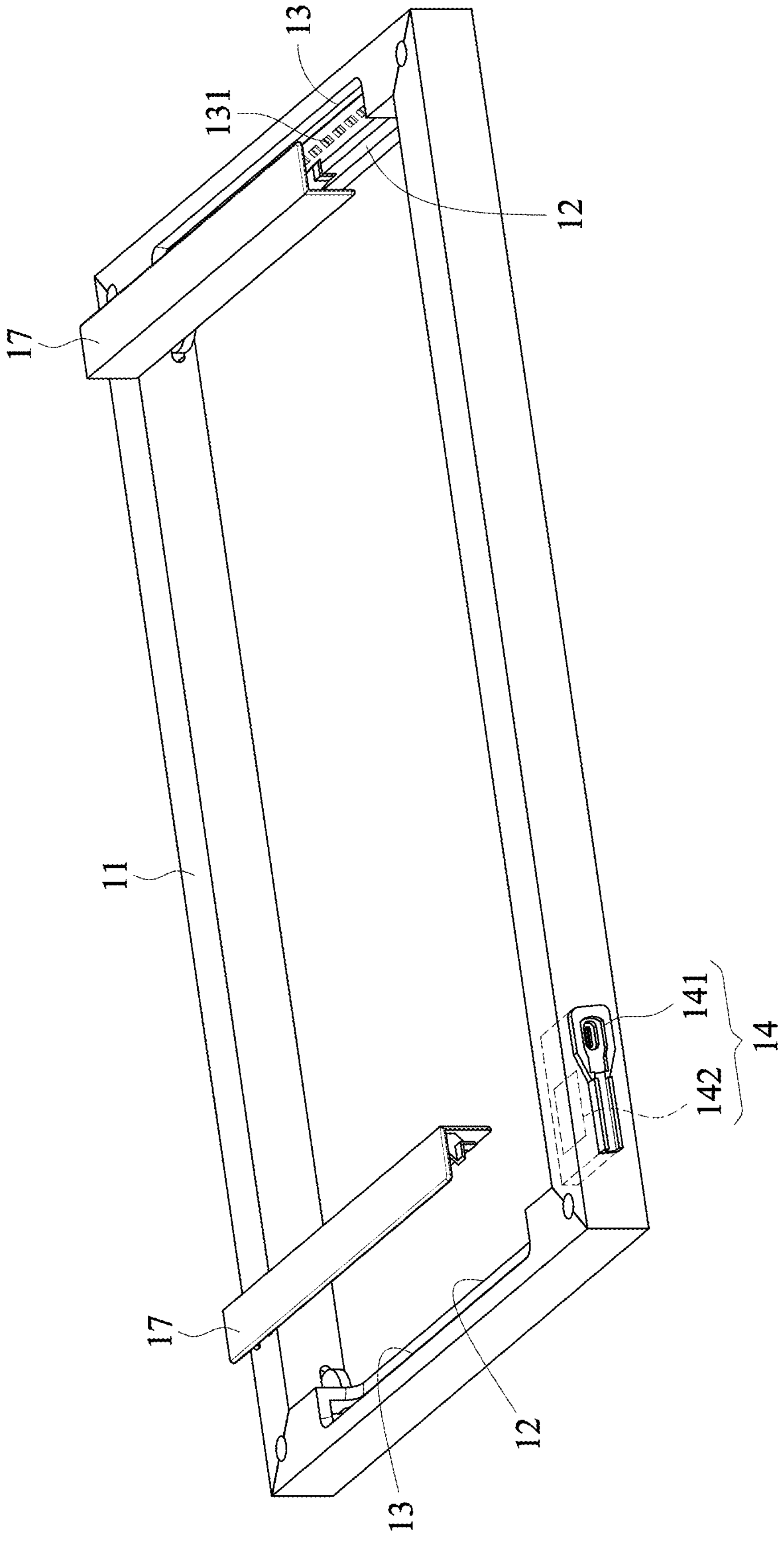
FIG. 2 is an exploded view of a part of the standing furniture having the built-in lamp in accordance with one embodiment of the disclosure.
Figure 3:
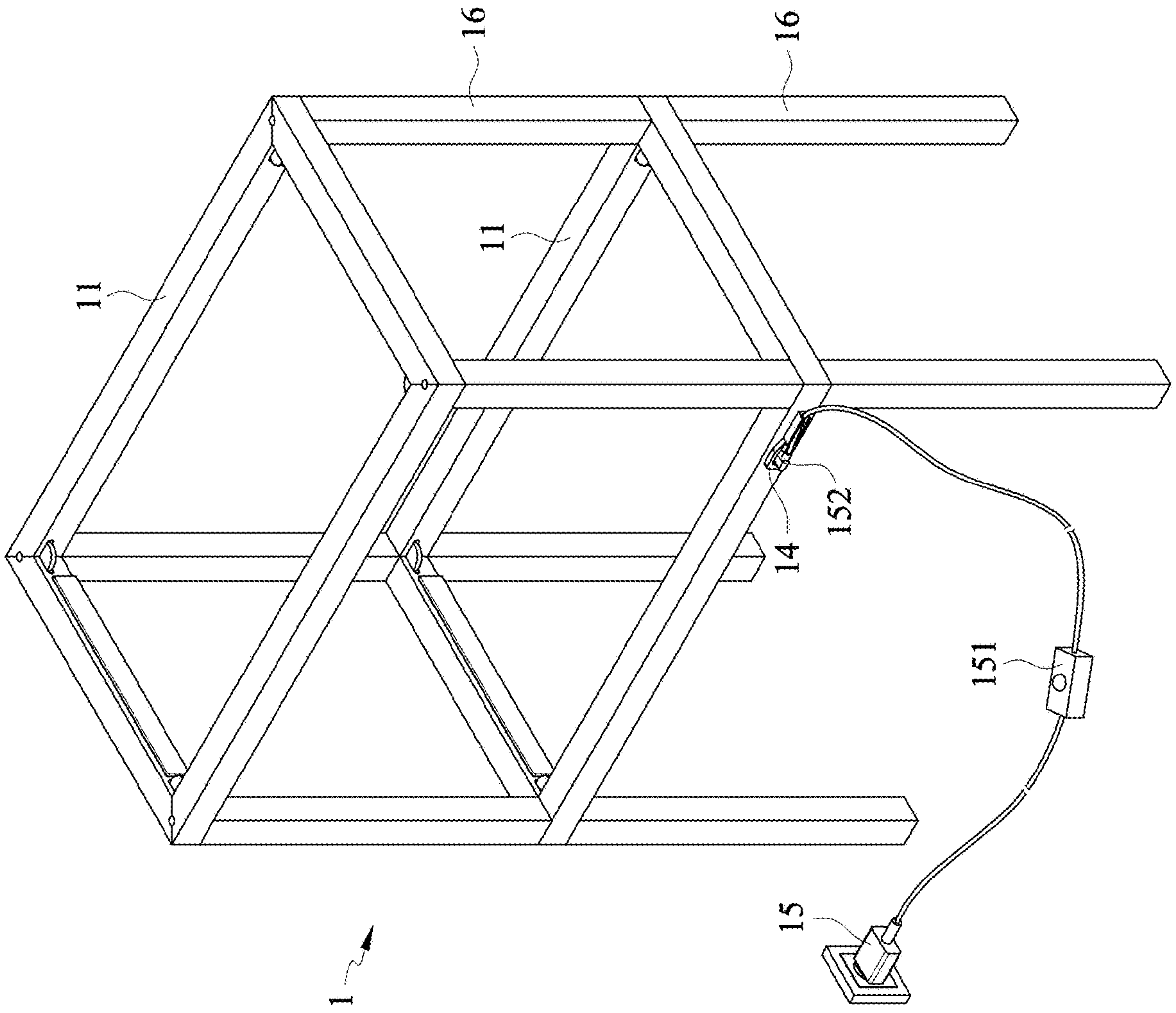
FIG. 3 is a perspective view of the standing furniture having the built-in lamp in accordance with one embodiment of the disclosure.

Please refer to FIG. 1, FIG. 2, and FIG. 3. FIG. 1 is a perspective view of a part of a standing furniture having a built-in lamp in accordance with one embodiment of the disclosure. FIG. 2 is an exploded view of a part of the standing furniture having the built-in lamp in accordance with one embodiment of the disclosure. FIG. 3 is a perspective view of the standing furniture having the built-in lamp in accordance with one embodiment of the disclosure. As shown in FIG. 1 and FIG. 2, the standing furniture 1 includes a base 11, two lamp holders 12, two circuit boards 13 and a connector interface 14 and lamp covers 17.

The lamp holders 12 are disposed in the base 11. In the embodiment, the base 11 is a rectangular frame. In another embodiment, the base 11 may be a circular frame or a triangular frame. The shape of the base 11 may be changed according to actual needs.

The circuit boards 13 are disposed in the base 11 and located on the lamp holder 12 respectively. The circuit boards 13 includes a plurality of light sources 131. In one embodiment, the light sources 131 are light-emitting diodes (LED). In another embodiment, the light sources 131 are LED arrays.

The connector interface 14 is disposed in the base 11 and includes a cartridge 141 and a connector socket module 142 disposed in the cartridge. The connector socket module 142 is electrically connected to the circuit board 13.

As set forth above, the circuit boards 13 can be separated from the connector interface 14, so the overall volume of the base 11 can be reduced. Thus, the user can conveniently install the connector interface 14 in the base. Besides, the appearance of the standing furniture 1 can be improved.

As shown in FIG. 3, the standing furniture 1 further includes an adapter module 15. The connector socket module 142 is electrically connected to an external power source (e.g., a utility power) via the adapter module 15.

The adapter module 15 has a controller 151. The controller 151 is provided with one or more switches or buttons. The user can adjust the color and/or the intensity of the light emitted by the light sources via the controller 151 according to actual requirements.

The standing furniture 1 may include two bases 11 and two supporting holders 16 (the embodiment is just for illustration; in another embodiment, the standing furniture 1 may include more bases 11 and supporting holders 16). One of the bases 11 is disposed on one of the supporting holders 16. The other of the supporting holders 16 is disposed on the base 11 and the other of the baes 11 is disposed on the supporting holder 16. In this way, the standing furniture 1 can have multiple layers, which can be decrease or increased according to actual needs. For example, the standing furniture 1 may be a table, a chair, a shelf, a cabinet, a closet, or a cupboard.

The embodiment just exemplifies the present disclosure and is not intended to limit the scope of the present disclosure; any equivalent modification and variation according to the spirit of the present disclosure is to be also included within the scope of the following claims and their equivalents.

Figure 4:
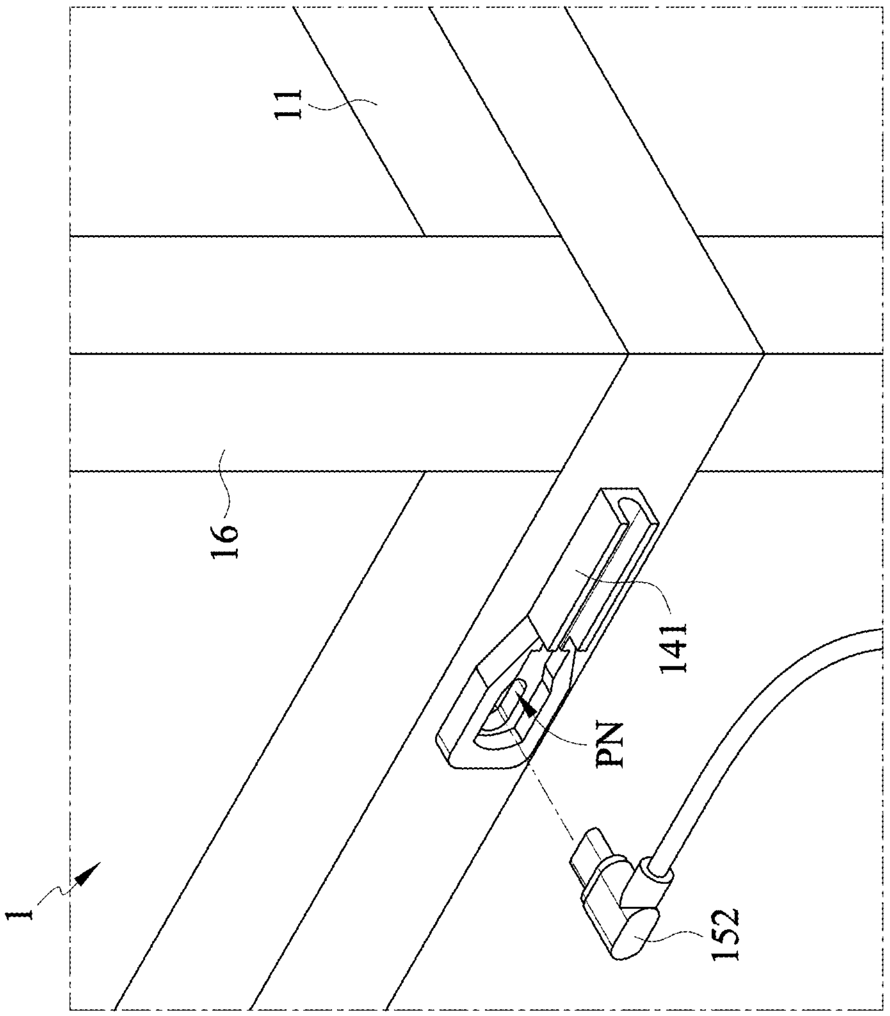
FIG. 4 is a partial enlargement view of the standing furniture having the built-in lamp in accordance with one embodiment of the disclosure.

Please refer to FIG. 4, which is a partial enlargement view of the standing furniture having the built-in lamp in accordance with one embodiment of the disclosure. As shown in FIG. 4, the adapter module 15 has a connector 152. The cartridge 141 has an opening PN. The connector 152 can pass through the opening PN and then be inserted into the connector socket module 142 inside the cartridge 141. In one embodiment, the connector 152 is a USB Type-C connector. In another embodiment, the connector 152 may be a USB Type-A connector, a USB Type-B connector or a mini-USB connector.

The embodiment just exemplifies the present disclosure and is not intended to limit the scope of the present disclosure; any equivalent modification and variation according to the spirit of the present disclosure is to be also included within the scope of the following claims and their equivalents.

Figure 5:
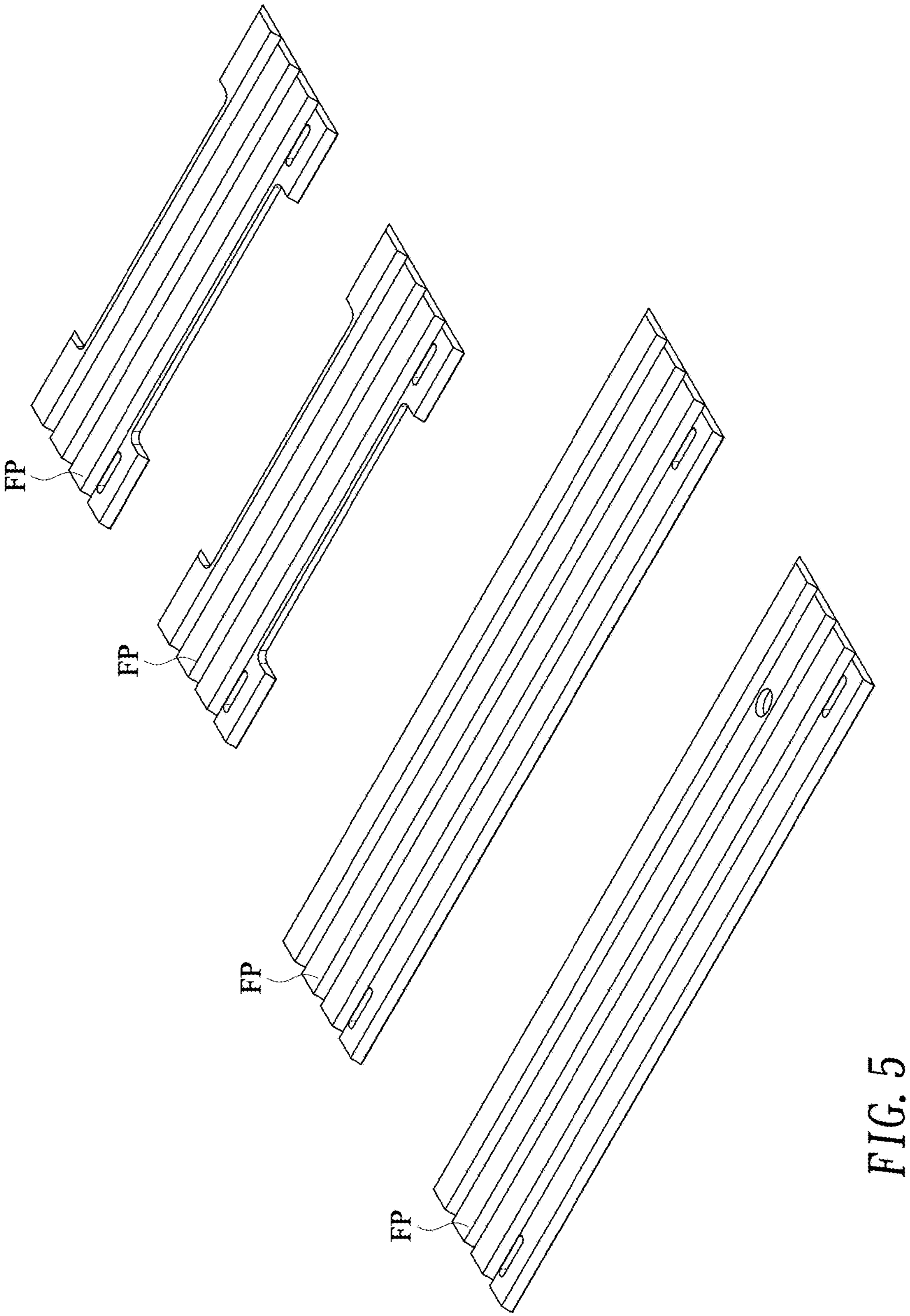

Please refer to FIG. 5~FIG. 12, which are schematic views of manufacturing a base of a standing furniture having a built-in lamp in accordance with another embodiment of the disclosure. The manufacturing method includes the following steps:

Step S1: providing four foldable plates FP, as shown in FIG. 5.

Figure 6:
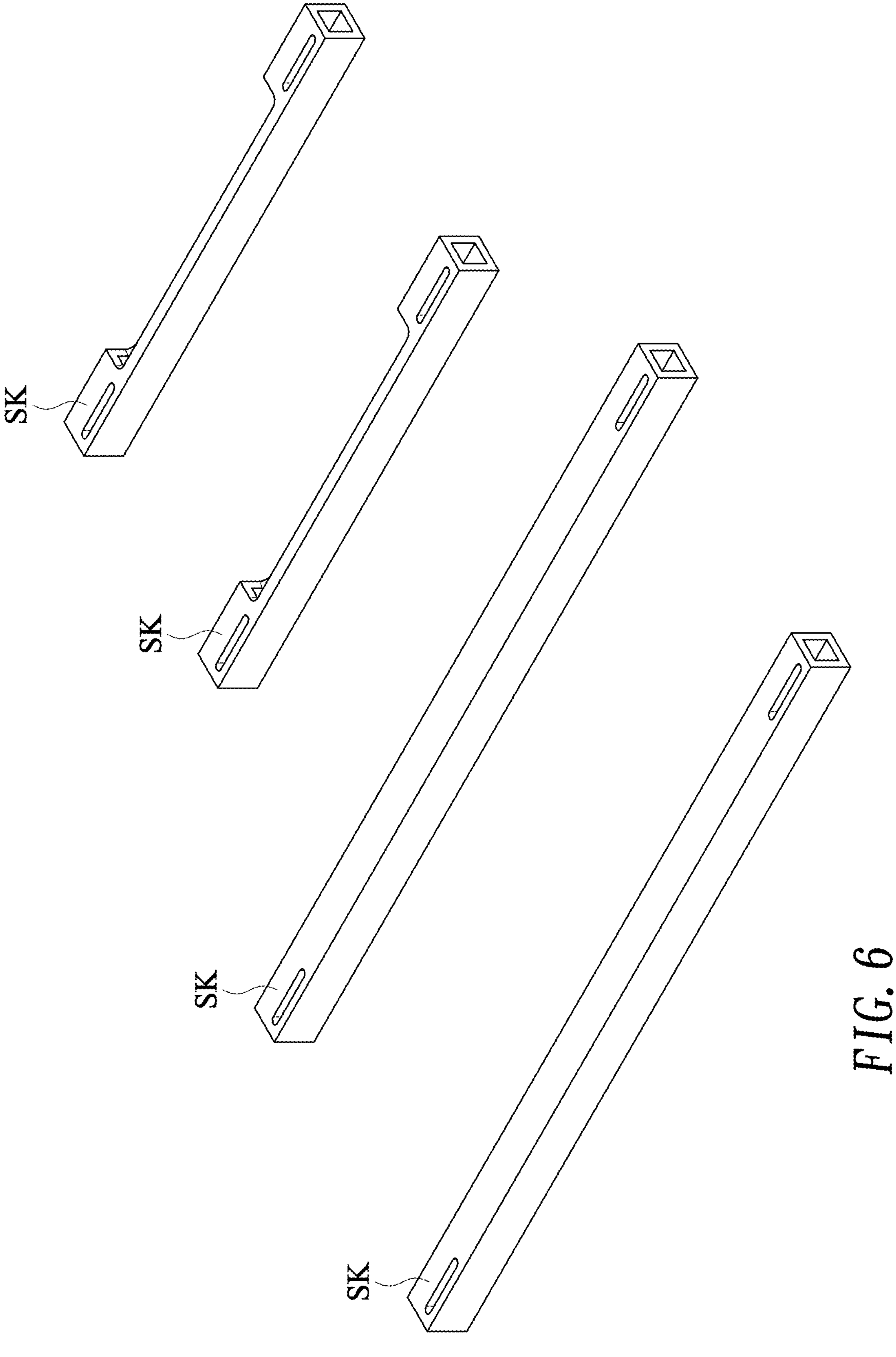

Step S2: folding the plates FP to form four sticks SK, as shown in FIG. 6. Two of the four sticks SK have recesses. The recesses can serve as lamp holders.

Figure 7:
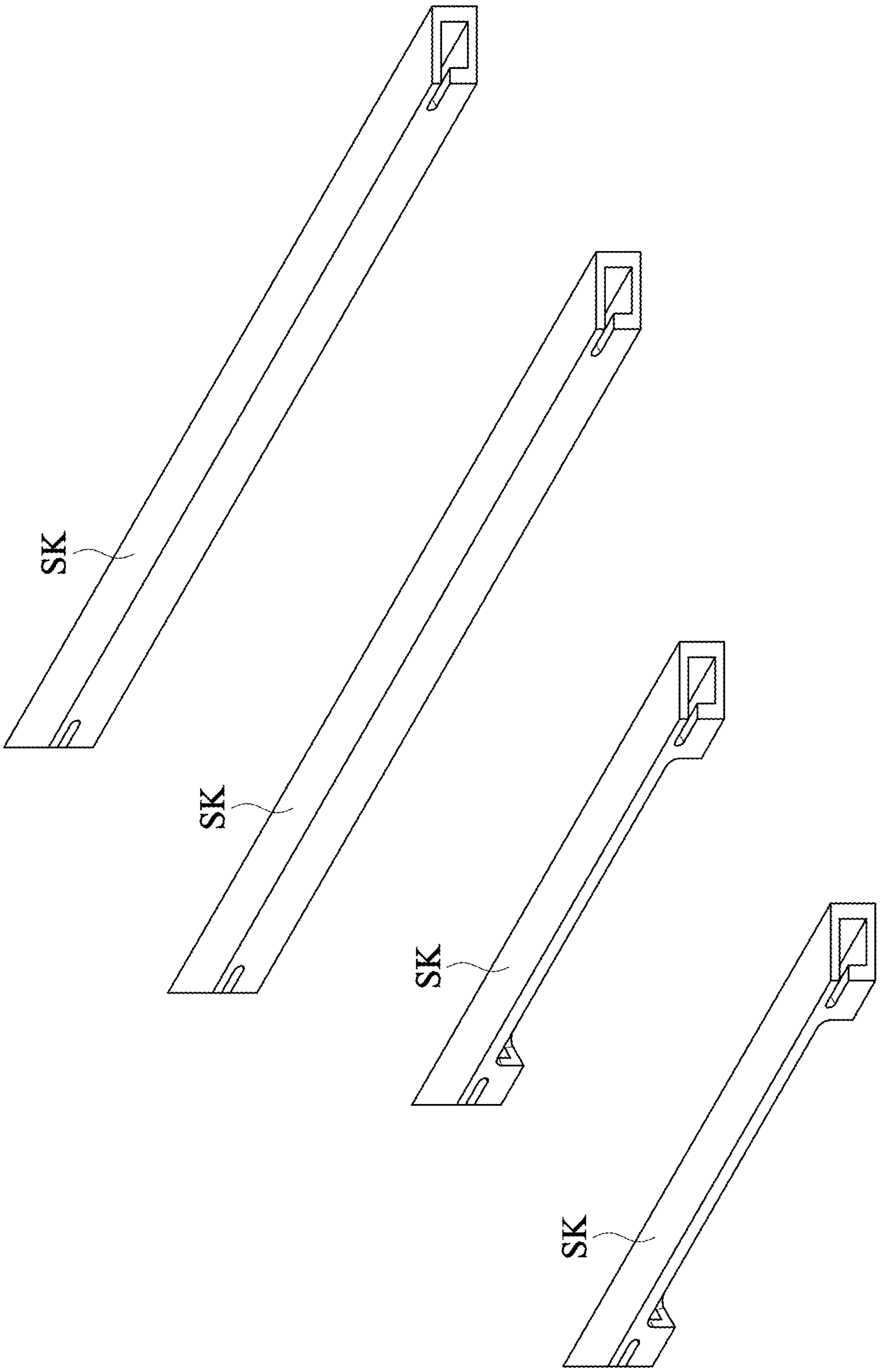

Step S3: cutting the two ends of each stick SK by a certain degree (e.g.,) 45°, as shown in FIG. 7.

Figure 8:
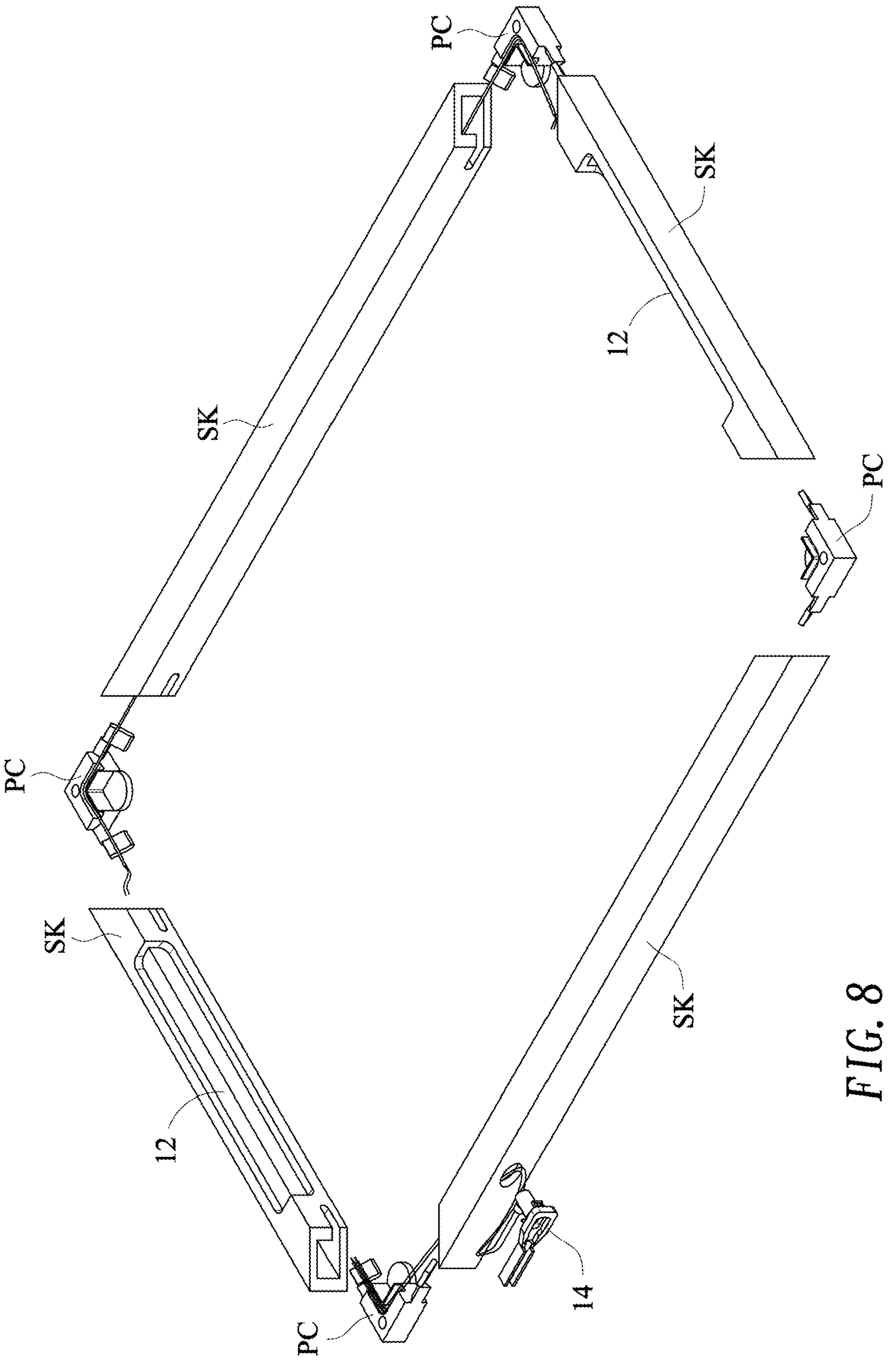

Step S4: installing a connector interface 14 (only a part of the connector interface 14 is shown in FIG. 8) on one of the sticks SK and assembling the four sticks SK by four plastic connectors PC to form a base 11, as shown in FIG. 8.

Figure 9:
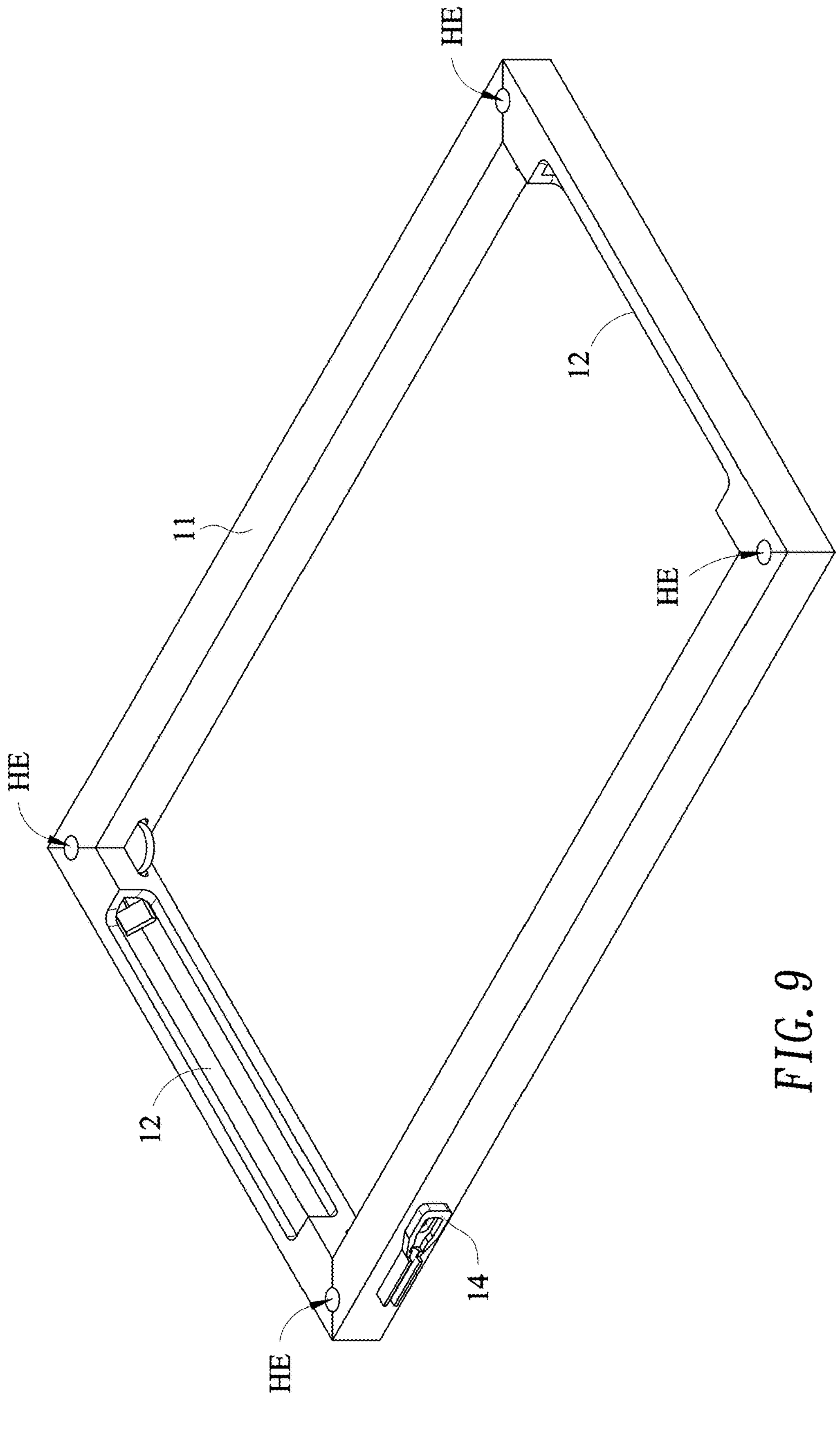

Step S5: drilling a hole HE at each of the four corners of the base 11, as shown in FIG. 9.

Figure 10:
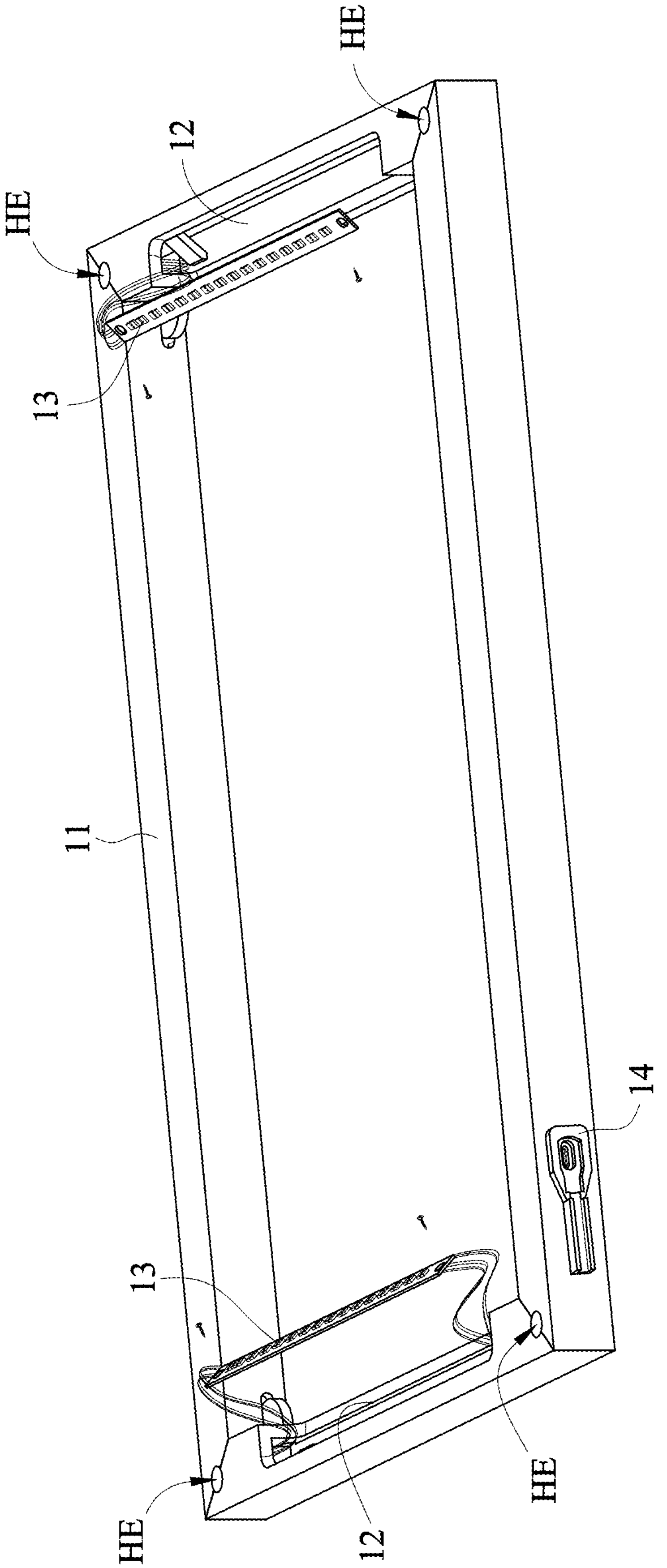

Step S6: installing a circuit board 13 on each of the lamp holders, as shown in FIG. 10.

Figure 11:
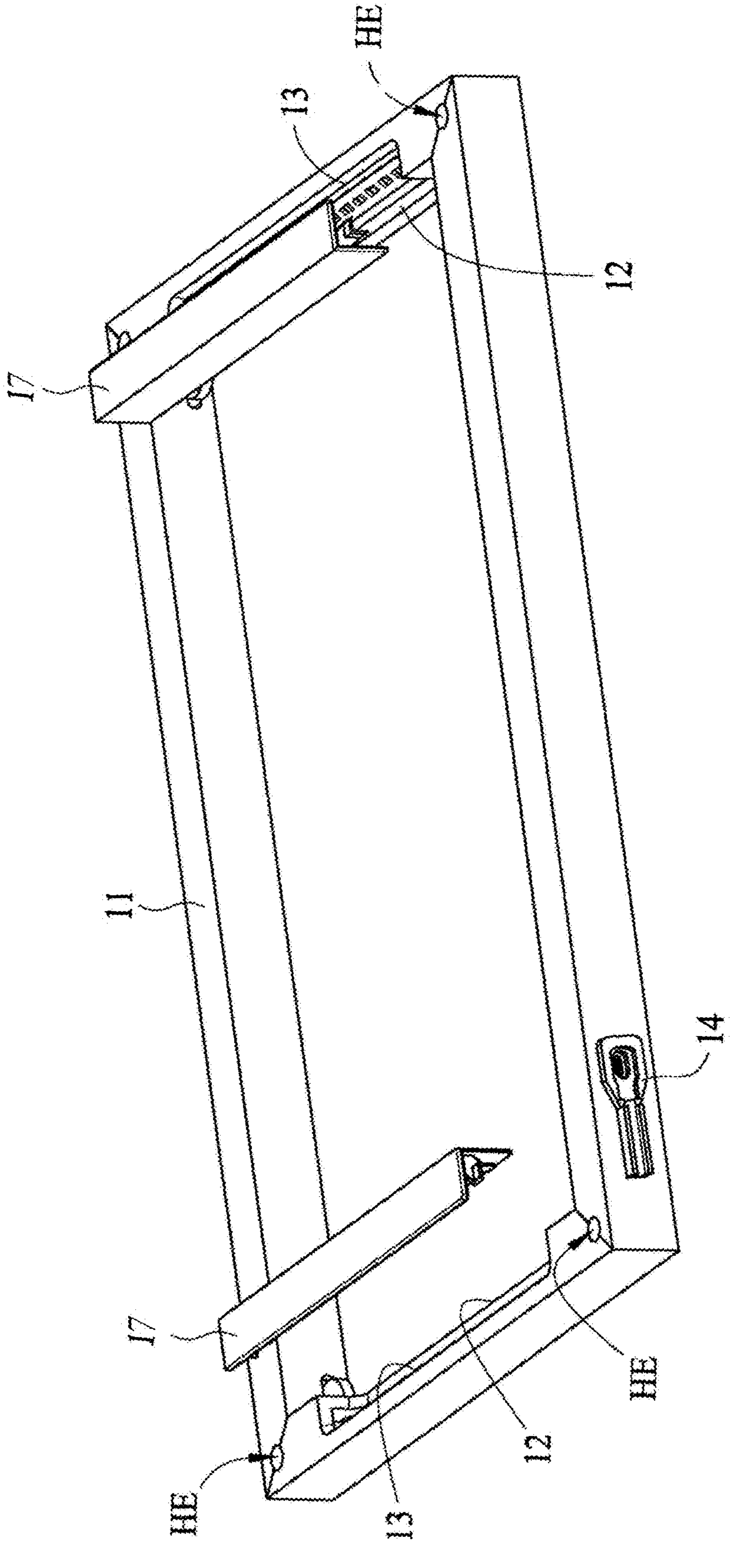
Figure 12:
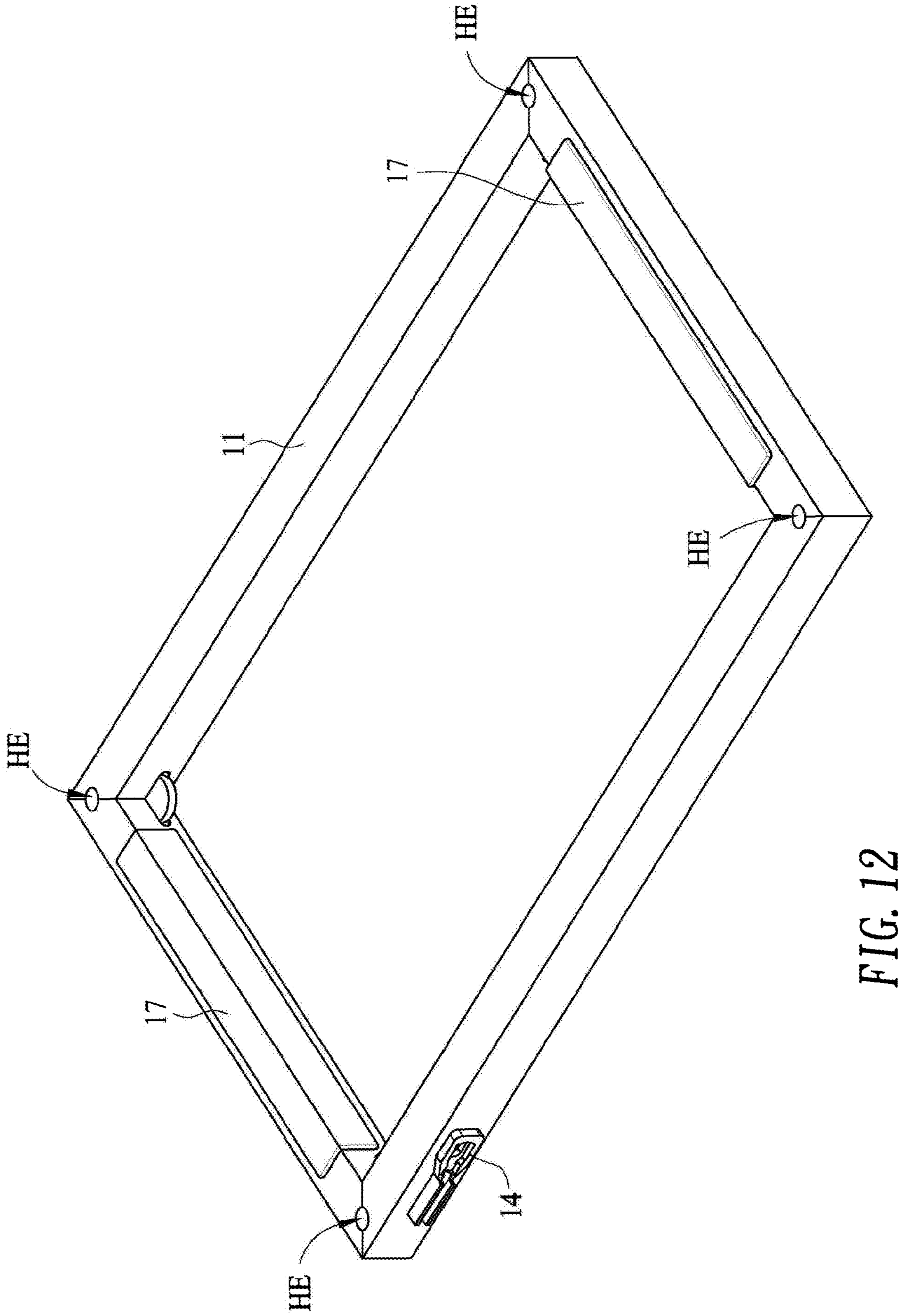

Step S7: installing two lamp covers 17 to cover the circuit boards 13 respectively, as shown in FIG. 11. Then, the manufacturing process of the base 11 is finished, as shown in FIG. 12.

The embodiment just exemplifies the present disclosure and is not intended to limit the scope of the present disclosure; any equivalent modification and variation according to the spirit of the present disclosure is to be also included within the scope of the following claims and their equivalents.

Please refer to FIG. 13, which is a perspective view of a standing furniture having the built-in lamp in accordance with another embodiment of the disclosure. The difference between this embodiment and the previous embodiment is that the standing furniture 1 has two connector interfaces 14 corresponding to the two bases 11 respectively, and the adapter module 15 has two connectors 152 and a connecting module 153. The adapter module 15 is connected to the connecting module 153 via a power cord Pd. The connecting module 153 is connected to the controller 151 via a power cord Pd. The controller 151 is connected to the connectors 152 via a power cord Pd and the two connectors 152 are inserted into the connecter interfaces 14 of the two bases 11 respectively (the structure of the connector interface 14 is shown in FIG. 2 and FIG. 4).

The embodiment just exemplifies the present disclosure and is not intended to limit the scope of the present disclosure; any equivalent modification and variation according to the spirit of the present disclosure is to be also included within the scope of the following claims and their equivalents.

Please refer to FIG. 14 and FIG. 15. FIG. 14 is a first partial enlargement view of a connecting module of the standing furniture having the built-in lamp in accordance with another embodiment of the disclosure. FIG. 15 is a second partial enlargement view of the connecting module of the standing furniture having the built-in lamp in accordance with one embodiment of the disclosure. As shown in FIG. 14, the connecting module 153 is a quick connect, which includes a plug connector 1531 and a connecting port 1532. In this embodiment, the plug connector 1531 is a USB plug connector. In another embodiment, the plug connector 1531 may be other currently available components with similar functions.

As shown in FIG. 15, the user can insert the plug connector 1531 into the connecting port 1532, and then rotate the plug connector 1531 in a first direction so as to fix the plug connector 1531 with the connecting port 1532 (the arrow AW shows the direction which the user rotates the plug connector 1531). Similarly, the user can rotate the plug connector 1531 in a second direction to separate the plug connector 1531 from the connecting port 1532. The first direction is opposite to the second direction. In another embodiment, the adapter module 15 may have several connecting modules 153, one for each level.

The embodiment just exemplifies the present disclosure and is not intended to limit the scope of the present disclosure; any equivalent modification and variation according to the spirit of the present disclosure is to be also included within the scope of the following claims and their equivalents.

To sum up, according to one embodiment of the present invention, the standing furniture includes a base, a lamp holder, a circuit board, a connector interface and an adapter module. The lamp holder is disposed in the base. The circuit board is disposed in the base and located on the lamp holder. The circuit board includes a plurality of light sources. The connector interface is disposed in the base and includes a cartridge and a connector socket module disposed in the cartridge. The connector socket module is electrically connected to the circuit board. The connector socket module is electrically connected to an external power source via the adapter module. Therefore, the circuit board can be separated from the connector interface, so the overall volume of the base can be reduced and the installation of the connector interface can be more convenient. Besides, the appearance of the standing furniture can be improved.

Besides, according to one embodiment of the present invention, the adapter module of the standing furniture further has a controller, and the connector interface is connected to the adapter module via the controller. The controller can be used to adjust the color and/or the intensity of the light emitted by the light sources. Thus, the user can adjust the light emitted by the built-in lamp according to actual requirements.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A standing furniture having a built-in lamp, comprising:

a base, including a frame comprising a first member and a second member joined together by a frame connector inserted into the first member and second member;

a lamp holder disposed and confined within the first member of the base;

a circuit board disposed and confined within the first member of the base and located on the lamp holder, wherein the circuit board comprises a first light source;

a connector interface disposed and confined within the second member of the base, and comprising a cartridge and a connector socket module disposed in the cartridge, wherein the connector socket module is electrically connected to the circuit board; and an adapter module, wherein the connector socket module is configured to electrically connect to an external power source via the adapter module;

wherein the cartridge includes both an opening and a slot exterior to the base and adjacent to each other, the slot securing a section of a wire electrically connected to the external power source via the adapter module.

2. The standing furniture having a built-in lamp of claim 1, further comprising a supporting holder, wherein the base is disposed on the supporting holder.

3. The standing furniture having a built-in lamp of claim 1, wherein the connector interface is a USB Type-A connector, a USB Type-B connector, a USB Type-C connector, or a mini-USB connector.

4. The standing furniture having a built-in lamp of claim 1, wherein said first lighting source is a light-emitting diode.

5. The standing furniture having a built-in lamp of claim 1, wherein the standing furniture is a table, a chair, a shelf, a cabinet, a closet, or a cupboard.

6. The standing furniture having a built-in lamp of claim 1, wherein said base comprises the first member being a first stick internally accommodating said lamp holder, the second member being a second stick for internally accommodating said connector interface, and the frame connector connecting said first stick and said second stick.

7. The standing furniture having a built-in lamp of claim 1, wherein a lamp cover secures to the base and encloses the circuit board and first light source in the lamp holder within the interior of the base.

8. The standing furniture having a built-in lamp of claim 1, wherein the adapter module has a connector inserted into the connector socket module.

9. The standing furniture having a built-in lamp of claim 8, wherein connector is inserted into the connector socket module after the connector passes through the opening.

10. The standing furniture having a built-in lamp of claim 1, wherein the adapter module further has a controller, and the connector interface is connected to the adapter module via the controller.

11. The standing furniture having a built-in lamp of claim 10, wherein the controller adjusts a color and/or an intensity of a light emitted by the first light source.

12. The standing furniture having a built-in lamp of claim 1, wherein the frame of the base is assembled into a rectangular frame by inserting the frame connector mating with the first member and the second member, thereby affixing the first member to the second member, the frame connector providing a conduit for electricity from the connector interface to the circuit board.

13. The standing furniture having a built-in lamp of claim 12, further comprises four supporting holders, each located at each corner of said rectangular frame.

14. The standing furniture having a built-in lamp of claim 1, further comprises a second light source, wherein said first light source and said second light source are positioned at two opposite sides of said base.

15. The standing furniture having a built-in lamp of claim 14, wherein said first light source and said second light source are identical.

16. The standing furniture having a built-in lamp of claim 1, further comprises a second base with a second light source and a second connector interface.

17. The standing furniture having a built-in lamp of claim 16, wherein the adapter module has a first connector inserted into the connector socket module and a second connector inserted into the second connector interface.

18. A standing furniture having a built-in lamp, comprising:

a base, including a frame comprising a first member and a second member joined together by a frame connector inserted into the first member and second member, wherein the first member and the second member are formed by folding a foldable plate into a respective tubular stick, and each end of each respective tubular stick is cut at a specific angle to expose a recess that corresponds to and accommodates one side of the frame connector;

a lamp holder internally disposed and confined within the first member of the base;

a circuit board internally disposed and confined within the first member of the base and located on the lamp holder, wherein the circuit board comprises a first light source;

a connector interface internally disposed and confined within a second member of the base, and comprising a cartridge and a connector socket module disposed in the cartridge, wherein the connector socket module is electrically connected to the circuit board via the frame connector;

an adapter module, wherein the connector socket module is configured to electrically connect to an external power source via the adapter module; and a controller connected to the connector interface to adjust a color of a light emitted by the first light source;

wherein the cartridge includes both an opening and a slot exterior to the base and adjacent to each other, the slot securing a section of a wire electrically connected to the external power source via the adapter module.

19. The standing furniture having a built-in lamp of claim 18, further comprising:

a second frame comprising a third member and a fourth member joined together by a second frame connector inserted into the third member and fourth member;

a second lamp holder internally disposed and confined within the third member;

a second circuit board internally disposed and confined within the third member of the base and located on the second lamp holder, wherein the second circuit board comprises a second light source;

a second connector interface internally disposed and confined within the fourth member, and comprising a second cartridge and a second connector socket module disposed in the second cartridge, wherein the second connector socket module is electrically connected to the second circuit board;

wherein the second cartridge includes both a second opening and a second slot exterior to the base, the second slot securing a second section of the wire electrically connected to the external power source via the adapter module;

wherein the second frame connector provides a conduit for electricity from the second connector interface to the second circuit board.

20. The standing furniture having a built-in lamp of claim 19, further comprising:

a connecting module having a plug connector and a connecting port, the connecting module positioned between the adapter module and the controller and having a rotating quick-connect plug connector for separating and connecting the plug connector and the connecting port.

* * * * *